United States Patent [19]
Shiba et al.

[11] Patent Number: 5,684,555
[45] Date of Patent: Nov. 4, 1997

[54] LIQUID CRYSTAL DISPLAY PANEL

[75] Inventors: Kouichi Shiba, Himeji; Ryuji Tada, Hyogo-ken, both of Japan

[73] Assignee: Kabushiki Kaisha Toshiba, Kawasaki, Japan

[21] Appl. No.: 574,193

[22] Filed: Dec. 18, 1995

[30] Foreign Application Priority Data

Dec. 19, 1994 [JP] Japan .................. 6-314825

[51] Int. Cl.⁶ .................. G02F 1/136; G02F 1/1345; G02F 1/1339
[52] U.S. Cl. .................. 349/149; 349/42; 349/153; 349/154
[58] Field of Search .................. 359/88, 80, 59; 349/42, 153, 154, 149

[56] References Cited

U.S. PATENT DOCUMENTS

| | | | |
|---|---|---|---|
| 5,148,301 | 9/1992 | Sawatsubashi et al. | 359/80 |
| 5,446,562 | 8/1995 | Sato | 359/59 |
| 5,510,918 | 4/1996 | Matsunaga et al. | 359/88 |
| 5,519,521 | 5/1996 | Okimoto et al. | 359/59 |

FOREIGN PATENT DOCUMENTS 4-178630  6/1992  Japan.

*Primary Examiner*—William L. Sikes
*Assistant Examiner*—Julie Ngo
*Attorney, Agent, or Firm*—Cushman, Darby & Cushman IP Group of Pillsbury Madison & Sutro LLP

[57] ABSTRACT

The present invention is to provide an LCD panel in which the effective display area is great relative to the outside dimension. The LCD panel comprises an array substrate, a counter substrate and a light modulating layer obtained by injecting liquid crystal into the gap between these substrates. The array substrate includes a display area and a seal region formed around the display area. The display area includes data lines, scanning lines, switching devices controlled by the scanning lines and pixel electrodes connected to the data lines. The seal region includes a first wiring line constituted by a plurality of narrow lines and arranged along the seal line. The counter substrate has a counter electrode and is arranged opposite to the array substrate with a gap therebetween. The counter substrate is adhered to the array substrate in the seal region. A voltage is supplied to the counter electrode through the first wiring line.

30 Claims, 4 Drawing Sheets

LIQUID CRYSTAL DISPLAY PANEL

BACKGROUND OF THE INVENTION

1. Field of the Invention

The present invention relates to a liquid crystal display panel for displaying an image in information equipment.

2. Description of the Related Art

In recent years, flat panel displays, represented by an LCD panel (Liquid Crystal Display panel), are used for various purposes, for example, a display of a personal computer or a word processor, a TV display or a projection type display, making use of the characteristics of light weight, thin package size and low power consumption.

In particular, an active matrix LCD panel, in which a three-terminal non-linear element is used as a switching device of each pixel electrode, has been researched and developed actively, since a satisfactory image display can be achieved without a crosstalk between adjacent pixels.

A structure of an active matrix LCD panel of a light transmission type will be briefly described below.

An active matrix LCD panel is formed as follows. An array substrate and a counter substrate are arranged so as to face each other with a predetermined gap therebetween and sealed with a sealing member on the periphery of the substrates. Liquid crystal material for forming a light modulating layer is injected into the gap thus formed between the substrates. Orientation films have been coated in advance on those surfaces of the array substrate and the counter substrate which are in contact with the liquid crystal material.

The array substrate is formed as follows. A plurality of data lines and a plurality of scanning lines are arranged so as to cross each other on a glass substrate. A TFT (Thin Film Transistor) is formed near each of the intersections of the data lines and the scanning lines. A plurality of pixel electrodes made of ITO (Indium Tin Oxide) are formed corresponding to the respective regions defined by the data lines and the scanning lines. Each pixel electrode is connected to the data line through the corresponding TFT serving as a switching device. Storage capacitor lines are arranged in parallel with the scanning lines on the glass substrate. An insulating layer is formed between the storage capacitor lines and the pixel electrodes, so that storage capacitance is constituted between the storage capacitor lines and the pixel electrodes.

The counter substrate is formed as follows. A light shielding layer is formed on the glass substrate in order to shield the TFTs and the pixel electrodes and a region around them. A counter electrode made of ITO is formed above the light shielding layer with an insulating film interposed therebetween. The counter electrode is connected to wiring lines formed on the array substrate through a transfer material made of resin in which conductive particles, such as silver particles, are dispersed.

A driver circuits board, for supplying driving voltages to the pixel electrodes and counter electrodes, is arranged adjacent to the array substrate. The driver circuits board and the array substrate are connected to each other with an FPC (flexible print circuit) or a TAB (tape automated bonding) in which an active device is arranged on the FPC. It is possible that driver circuits are formed directly on the array substrate.

In the active matrix LCD panel, it is required that the ratio of an effective display area to the outside dimension of the panel should be as great as possible. For example, Jpn. Pat. Appln. KOKAI Publication No. 4-178630 discloses a technique for reducing the area, in which the sealing agent is flown out, by a sealing agent stopper having a step formed along the seal region provided between the effective display area and the seal region. With this structure, the width of a boundary region between the effective display area and the seal region can be set small, so that the ratio of the effective display area to the outside dimension of the panel can be as great as possible.

Further, to satisfy the above requirement, it can be considered to reduce the width of the seal region or to reduce the area of a portion around the seal region. However, if the width of the seal region is reduced, the strength of adhesion between the array substrate and the counter substrate is lowered. This causes various problems: for example, removal of the sealing agent itself or the sealing agent accompanied with a thin film deposited on the array substrate.

SUMMARY OF THE INVENTION

The present invention has been made in consideration of the above problems. Accordingly, an object of the present invention is to provide an LCD panel, in which the width of a seal region can be reduced without lowering the strength of adhesion between the two substrates. Another object of the present invention is to provide an LCD panel which is connected to driver circuits on only two sides of the LCD panel, so that the ratio of the effective display area to the outside dimension of the panel can be great.

According to the present invention, there is provided an LCD panel comprising:

a first substrate including a display area, a seal region formed around the display area, and a peripheral region formed around the seal region, the display area including pixel electrodes, and the seal region including a first wiring line which is constituted by a plurality of narrow lines arranged along the seal region;

a second substrate including a counter electrode, to which a voltage is applied through the first wiring line, the second substrate being arranged opposite to the first substrate with a gap interposed therebetween and adhered to the first substrate in the seal region; and a light modulating layer held between the first and second substrates.

In the present invention, the first wiring line arranged in the seal region is constituted by a plurality of narrow lines to increase the effective adhesion area between the sealing agent and the first substrate. Therefore, even if the width of the seal region is narrow, required adhesion strength can be ensured. As a result, the outside dimension of the LCD panel can be small.

In addition, since the first wiring line is formed along the seal region, a voltage can be applied to the counter electrode through the first wiring line from a plurality of desired points of a peripheral portion of the first substrate. For this reason, it is only necessary that a driving circuit for applying a voltage to the counter electrode is connected to at least one side of the LCD panel. As a result, the outer dimension of the LCD panel can be small compared with the effective display area.

If the first wiring line is divided into at least three narrow lines in the seal region, the advantage of increasing the effective adhesion area can be obtained.

The counter electrode can be connected to the first wiring line through connecting members arranged between the first and second substrates outside or in the seal region.

Further, part of the narrow lines of the first wiring line can be arranged in a boundary region between the seal region and the display area, as well as in the seal region. With this structure, the sealing agent is prevented from flowing out of the seal region to the display area. As a result, the width of the boundary region between the seal region and the display area can be small.

Furthermore, the second wiring line drawn out of the display area across the seal region may be constituted by a plurality of narrow lines, like the first wiring line. In this case, the amount of the sealing agent flowing along the second wiring line can be reduced.

Instead of dividing the first wiring line into narrow lines, a plurality of openings may be formed along the longitudinal direction of the first wiring line, so that the effective adhesion area between the sealing agent and the first substrate can be increased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 7A and 7B are schematic diagrams showing states of the flown-out sealing agent along connecting wires, in which FIG. 7A shows a conventional art and FIG. 7B shows the present invention.

DETAILED DESCRIPTION OF THE PREFERRED EMBODIMENT

Figure 1:
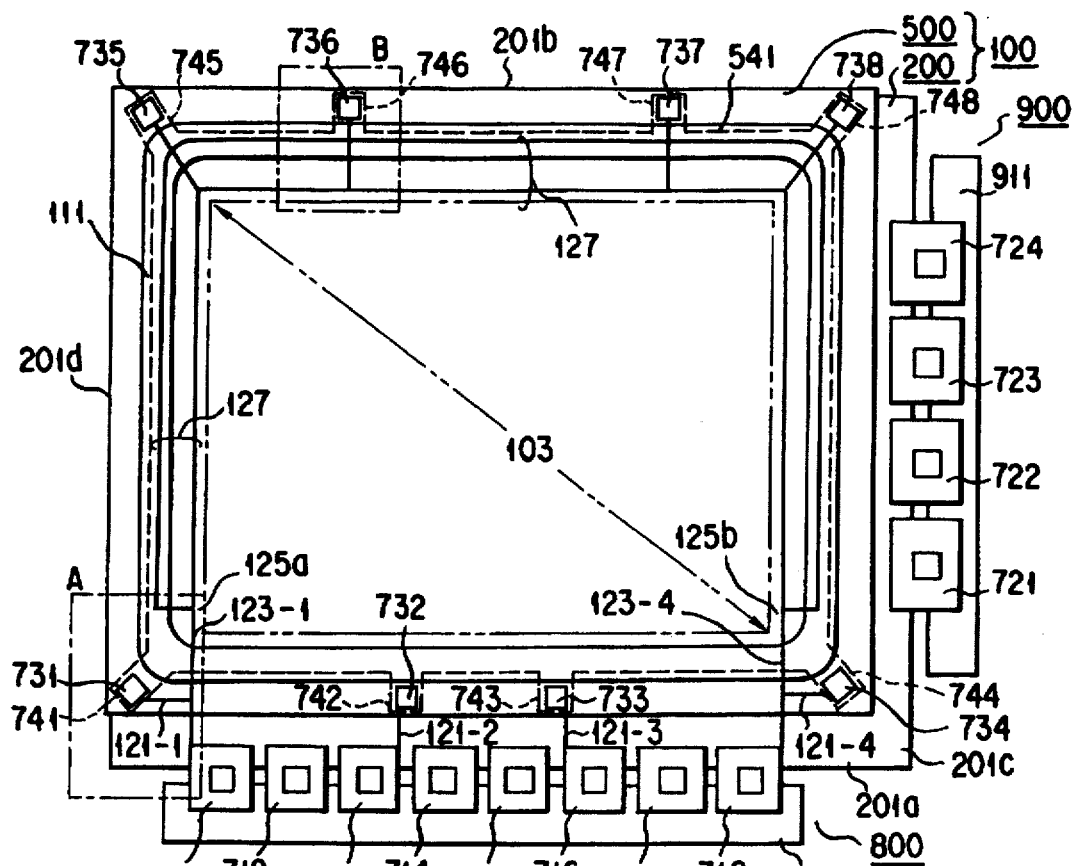
FIG. 1 is a plan view of an active matrix LCD panel according to an embodiment of the present invention.

FIG. 1 is a plan view showing an active matrix LCD panel of a light transmission type according to an embodiment of the present invention. An active matrix LCD panel 100 is comprised of an array substrate 200, a counter substrate 500, an X driver circuits board 800, a Y driver circuits board 900, and so on. The panel 100 includes a display area 103 having a diagonal of 14 inches.

Figure 2:
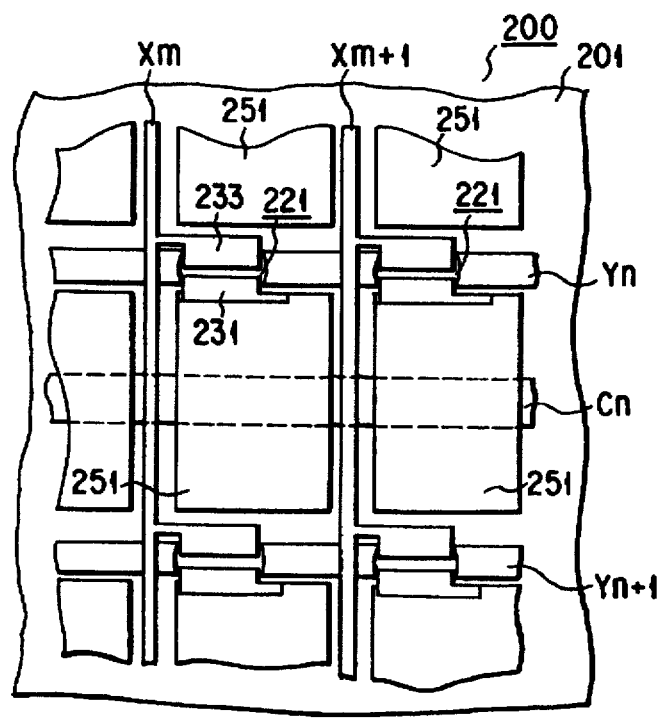
FIG. 2 is a plan view of part of the display area arranged on the array substrate of the active matrix LCD panel shown in FIG. 1.

FIG. 2 is a plan view showing part of the display area 103 arranged on the array substrate 200. 640×3 data lines $X_i$ ($i=1, 2, 3, \ldots 1920$) and 480 scanning lines $Y_i$ j ($j=1, 2, 3, \ldots 480$) are arranged perpendicular to each other on a glass substrate 201. TFTs 221 are formed near the intersections of the respective data lines and the scanning lines. Each scanning line $Y_j$ is used as the gate electrode of a TFT 221. Each data line $X_i$ is connected to a pixel electrode 251 via the TFT 221. Further, storage capacitor lines $C_j$ are arranged parallel with the scanning lines $Y_j$ under the pixel electrodes 251 with insulating film interposed therebetween, so that storage capacitance is constituted by the pixel electrodes 251 and the storage capacitor lines $C_j$.

Figure 3:
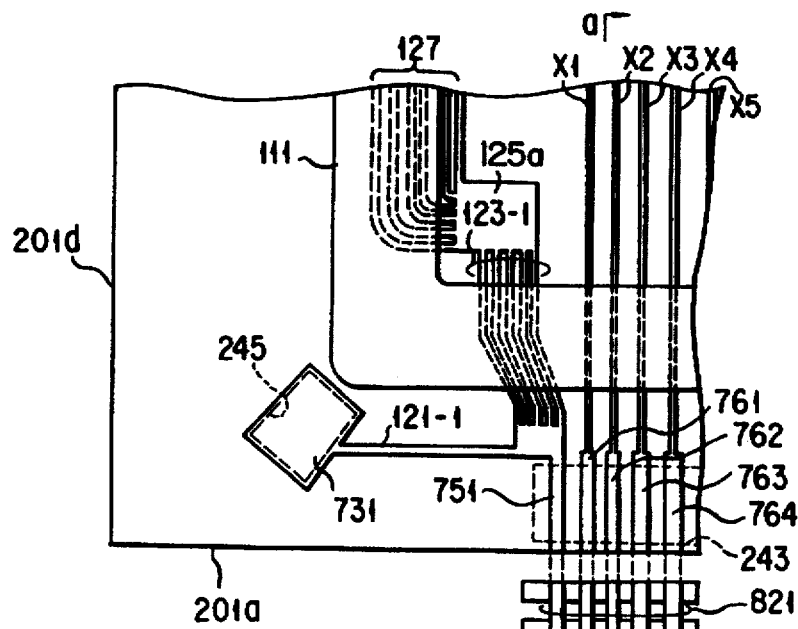
FIG. 3 is an enlarged view of part of a region A of the active matrix LCD panel shown in FIG. 1.
Figure 4:
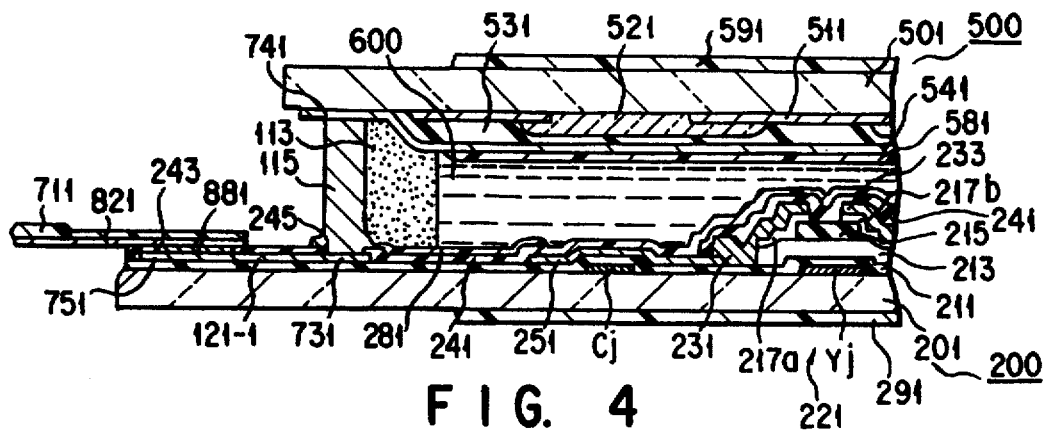
FIG. 4 is a cross-sectional view of part of the active matrix LCD panel shown in FIG. 3, taken along the line a–a'.

FIG. 3 is an enlarged view of part of a region A of the active matrix LCD panel shown in FIG. 1. FIG. 4 is a cross-sectional view taken along the line a–a' in FIG. 3.

As shown in FIG. 4, the scanning line $Y_j$ and the storage capacitor line $C_j$ are formed on the glass substrate 201. The scanning line $Y_j$ itself is used as the gate electrode of the TFT 221. A gate dielectric 211, having a laminated structure of silicon oxide and silicon nitride, is formed on the gate electrode $Y_j$. A channel 213 made of amorphous silicon (a-Si:H) is formed on the gate dielectric 211. A channel protecting layer 215 made of silicon nitride is formed in alignment with the gate electrode $Y_j$ on the channel 213. A source electrode 231 is formed above one end portion of the channel 213, with a low-resistance semiconductor layer 217a made of an n$^+$-type amorphous silicon interposed therebetween. A drain electrode 233 is formed above the other end portion of the channel 213, with a low-resistance semiconductor layer 217b made of an n$^+$-type amorphous silicon interposed therebetween. The drain electrode 233 is a line dividing from the data line $X_i$ and formed as part of the data line $X_i$ (FIG. 2). A protective overcoat 241 made of silicon nitride is arranged on the TFT 221 and around the pixel electrode 251. The array substrate 200 is formed in the manner as has been described above. Further, an orientation film 281 is coated on the array substrate 200.

A light shielding matrix layer 511, made of chromium (Cr), is formed on the glass substrate 501. Color filters 521, corresponding to the three primary colors of red, green and blue, are arranged in the light shielding layer 511. The light shielding layer 511 shields a region above the TFT 221, a region between the data line $X_i$ and the pixel electrode and a region between the scanning line $Y_j$ and the pixel electrode. A filter protecting layer 531 is formed on the light shielding layer 511 and the color filters 521. A counter electrode 541 made of ITO is formed on the filter protecting layer 531. The counter substrate 500 is formed in the manner as has been described above. Further, an orientation film 581 is coated on the counter substrate 500.

The array substrate 200 and the counter substrate 500 are arranged so as to face each other with a 5 μm gap therebetween. The substrates are adhered to each other with a sealing agent 113 in a seal region (111 in FIG. 1) in their peripheral portions. A nematic liquid crystal material 600 is injected into the gap thus formed and serves as a light modulating layer. Polarizing filters 291 and 591 are respectively adhered to the outer surfaces of the array substrate 200 and the counter substrate 500. In the manner as described above, the active matrix LCD panel is formed.

To reduce the outer dimension of the overall active matrix LCD panel according to the present invention, the data lines $X_i$ are drawn out from only a first longer side 201a, while the scanning lines $Y_j$ are drawn out from only a first shorter side 201c. Further, as shown in the enlarged view of FIG. 3, the data lines $X_i$ are connected to data line pads 761 to 764 arranged along the first longer side 201a. Similarly, the scanning lines $Y_j$ are connected to scanning line pads (not shown) arranged along the first shorter side 201c.

As shown in FIG. 3, the data line pads 761 to 764 are exposed through a slit 243 formed in the protective overcoat 241. The data line pads 761 to 764 are electrically connected to output leads 821 of a wiring film 711 via an anisotropic conductive film 881 (FIG. 4). Input leads 831 of the wiring film 711 are soldered to the X driver circuits board 800. In this manner, all the data lines $X_i$ are connected to the X driver circuits board 800 through the eight wiring films 711 to 718, respectively.

Likewise, the scanning line pads (not shown) are exposed through a slit formed in the protective overcoat 241. The scanning line pads are electrically connected to output leads of wiring films 721 to 724 (FIG. 1) via an anisotropic conductive film 881 (FIG. 4). Input leads 831 of wiring films 721 to 724 are soldered to the Y driver circuits board 900. In this manner, all the scanning lines $Y_i$ are connected to the Y driver circuits board 900 through the four wiring films 721 to 724, respectively.

In the aforementioned LCD panel, to reduce the amplitude of the signal data voltage, it is necessary to perform frame inversion drive for inverting the polarity of the potential of the counter electrode with respect to the reference potential in every frame period, or line inversion drive for inverting the polarity of the potential of the counter electrode with respect to the reference potential in every horizontal scanning period or periods. In this case, since the counter electrode 541 made of ITO has a relatively high resistance, it is desirable that voltages are applied to the counter electrode 541 from a plurality of sources arranged around it.

Figure 5:
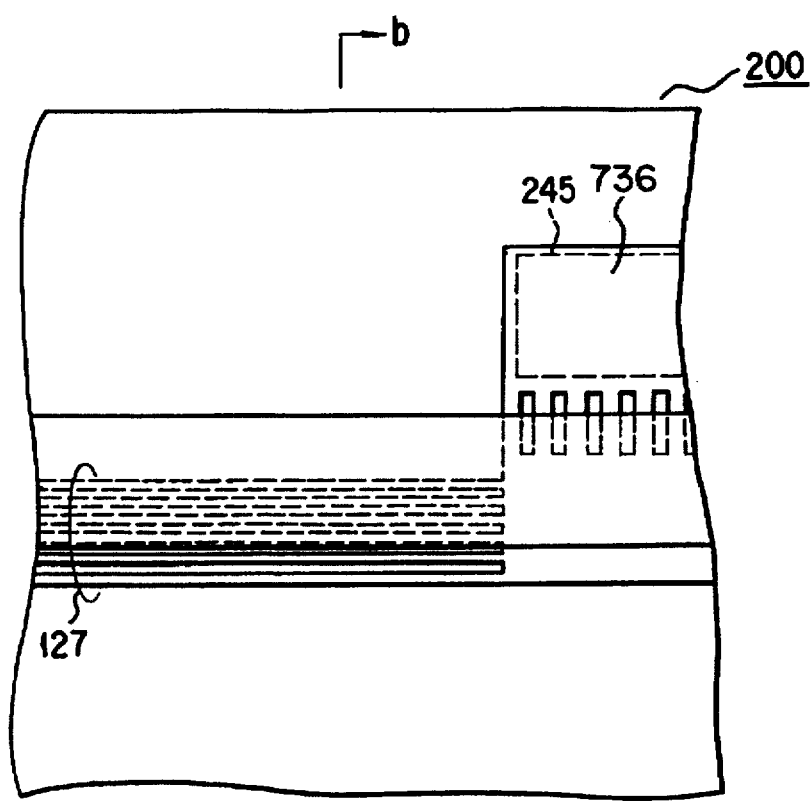
FIG. 5 is an enlarged view of part of a region B of the active matrix LCD panel shown in FIG. 1.

For this reason, according to this embodiment, as shown in FIG. 1, four power supply pads 731 to 734 are arranged along the first longer side 201a and four power supply pads 735 to 738 are arranged along a second longer side 201b, in a region outside the seal region 111 on the array substrate 200. The power supply pads 731 to 738 are exposed through slits 245 (FIGS. 3 and 5) formed in the protective overcoat 241. On the side of the counter electrode 541 formed on the counter substrate 500, connecting projections 741 to 748 corresponding to the power supply pads 731 to 738 are formed. As shown in FIG. 4, the power supply pads 731 to 738 are electrically connected to the connecting projections 741 to 748 via a transfer material 115 made of resin in which silver particles are dispersed.

A voltage is supplied to the power supply pads 731 to 734 arranged along the first longer side 201a from the X driver circuits board 800 through wiring films 711, 713, 716 and 718 connected to the first longer side 201a, in the following manner. As shown in FIG. 3, an output lead 821a of the wiring film 711 is connected to a common pad 751 on the array substrate 200. The common pad 751 is connected to the power supply pad 731 through a third wiring line 121-1. Thus, a voltage is supplied to the power supply pad 731 through an outermost input lead 831a of the wiring film 711. Similarly, as shown in FIG. 1, a voltage is supplied to the power supply pad 732 from an outermost input lead of the wiring film 713 through a third wiring line 121-2, to the power supply pad 733 from an outermost input lead of the wiring film 716 through a third wiring line 121-3, and to the power supply pad 734 from an outermost input lead of the wiring film 718 through a third wiring line 121-4.

On the other hand, since a driver circuits board is not arranged near the second longer side 201b, a voltage is supplied to the power supply pads 735 to 738 arranged along the second longer side 201b, in the following manner. As shown in FIG. 3, the output lead 821a of the wiring film 711 is connected to the common pad 751 on the array substrate 200. A second wiring line 123-1 is drawn from the common pad 751 and divided into five narrow lines (width: 20 μm, interval 20 μm) outside the seal region 111. The second wiring line 123-1 is guided across the seal region 111 (width: 1.5 mm) to an interconnecting pad 125a formed inside the seal region 111. A first wiring line 127 is drawn from the interconnecting pad 125a and divided into six narrow lines (width: 20 μm, interval: 20 μm). As shown in FIG. 1, the first wiring line 127 is guided along a second shorter side 201d to the second longer side 201b, and connected to the power supply pads 735 to 738 through a branch wiring line. Then, the first wiring line 127 is guided along the first shorter side 201c to the first longer side 201a, and the narrow lines meet together at an interconnecting pad 125b. Thereafter, the first wiring line 127 is divided into five narrow lines, serving as second wiring lines 123-4, which are guided across the seal region 111 and connected to output leads of the wiring film 718 via the common pad. In this way, a voltage is supplied through the wiring films 711 and 718 to the power supply pads 735 to 738 arranged along the second longer side 201b from the X driver circuits board 800 located in proximity to the first longer side 201a.

As shown in FIG. 3, four narrow lines of the first wiring line 127 are located in the seal region 111, the other two narrow lines thereof are located in a boundary region between the seal region 111 and the display area 103.

In the case where TFTs of bottom gate type are used as switching devices as in the above embodiment, the power supply pads 731 to 738, the common pad 751, the third wiring lines 121-1 to 121-4, the inter-connecting pad 125a, and 125b the second wiring lines 123-1 to 123-4, and the first wiring line 127 can be formed in the same step of forming the data lines $X_i$. The structure of the present invention, therefore, does not increase the number of manufacturing steps. Further, depending on the kind of the TFTs, the aforementioned wiring lines can be formed in the same step of forming the scanning lines $Y_j$.

Moreover, the first wiring lines 127 may be formed in the step of forming the scanning lines $Y_j$ and the data lines $X_i$, respectively, thereby constituting a two-layered structure. In this case, if the layers are partially connected to each other, the wiring defect can be prevented and the manufacturing yield can be improved.

In the above embodiment, the voltage is supplied to the counter electrode 541 only from the X driver circuits board 800 through the wiring films and the data line pads. However, a voltage can be additionally supplied from the Y driver circuits board 900 to the counter electrode 541.

Further, in the above embodiment, the first wiring line 127 is arranged along the seal region 11 on the three sides 201b, 201c and 201d of the array substrate. However, if the first wiring line 127 is arranged on at least one side of the array substrate, the advantage of the present invention can be achieved to a certain extent.

Furthermore, in the above embodiment, the X and Y driver circuits 811 and 911 are provided on the boards 800 and 900 different from the LCD panel 100 and the boards are connected to the LCD panel 100 through the wiring films 711 to 718 and 721 to 724. However, the driver circuits can be directly formed on the array substrate 200.

Figure 8:
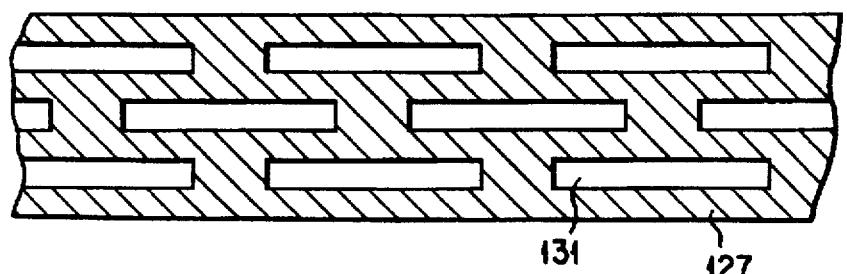
FIG. 8 is a diagram showing a wiring line in which a plurality of openings are formed along the longitudinal direction.

In the above embodiment, the first wiring line 127 is constituted by a plurality of narrow lines. However, a plurality of openings 131 may be formed in the first wiring line along the longitudinal direction, as shown in FIG. 8, so that the effective adhesion area between the sealing agent 113 and the array substrate 200 can be increased.

Advantages of the present invention will now be described.

(a) According to the present invention, the first wiring line 127 is arranged along the seal region 111 and the voltage is supplied to the counter electrode 541 through a plurality of power supply pads 731 to 738 branched from the wiring line. As a result, as has been described above, the voltage can be supplied from the X driver circuits board arranged in proximity to the first longer side 201a through the first wiring line 127 to the power supply pads 735 to 738 arranged along the second longer side 201b. With this structure, the data lines $X_i$ are drawn out of the first longer side 201a of the array substrate and the scanning lines $Y_j$ are drawn out of the first shorter side 201c, so that the array substrate 200 is connected to the X or Y driver circuits board 800 or 900 only at the first longer side 201a and the first shorter side 201c of the array substrate. As a result, the outside dimension of the LCD panel 100 can be small relative to the display area 103.

Since the first wiring line 127 is constituted by narrow lines and some of them are arranged in the seal region 111, while the other are arranged in the boundary portion between the seal region 111 and the display area 103 (FIG. 3), the first wiring line 127 does not cause an increase of the outside dimension of the LCD panel 100.

In addition, since the voltage can be supplied to the counter electrode 541 from desired points on the periphery of the array substrate 200 through the first wiring line 127 and the power supply pads 731 to 738, various driving methods, such as frame inversion drive or line inversion drive, can be applied satisfactorily.

(b) Since the first wiring line 127 arranged along the seal region 111 is constituted by a plurality of narrow lines (FIG. 3), the effective adhesion area between the sealing agent 113 and the array substrate 200 is relatively large. For this reason, the width of the seal region 111 can be reduced without a risk of removal of the sealing agent 113 from the array substrate 200. As a result, the outside dimension of the LCD panel 100 can be reduced.

In the above embodiment, the first wiring line 127 is constituted by six narrow lines having the 20 μm width and four of them are arranged in the seal region 111. However, if at least three narrow lines of the first wiring line are arranged in the seal region 111, the advantage of increasing the effective adhesion area can be obtained.

Figure 6:
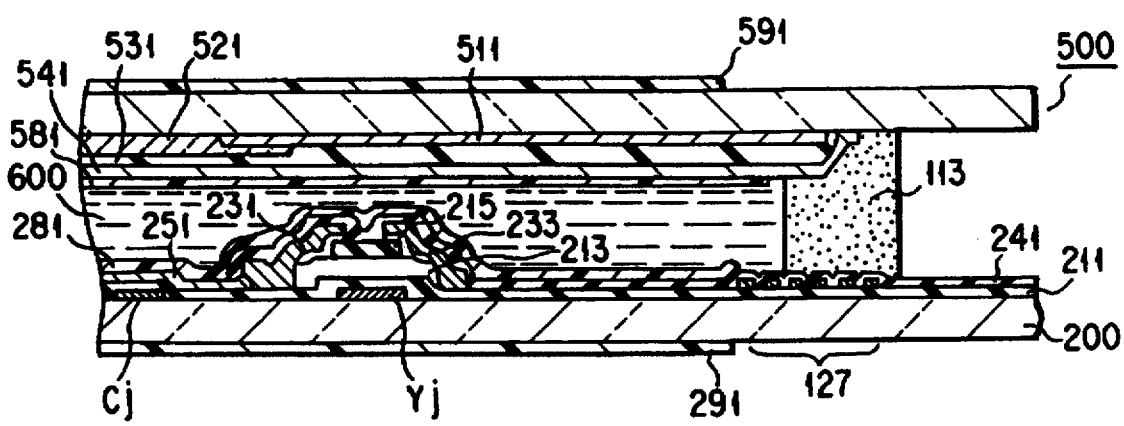
FIG. 6 is a cross-sectional view of part of the active matrix LCD panel shown in FIG. 5, taken along the line b–b'.

(c) Since the first wiring line 127 is constituted by a plurality of narrow lines as shown in FIG. 6, the protective overcoat 241 and the gate dielectric 211 are directly connected to each other through the gap between the narrow lines. As a result, the risk of removal of the first wiring line 127 together with the sealing agent 113 is reduced. Accordingly, the degree of freedom of selecting material of the sealing agent 113, depending on the adhesion capacity, can be increased.

(d) Since part of the first wiring line 127 is arranged in the boundary region between the seal region 111 and the display area 103 (FIG. 3), the sealing agent 113 is prevented from flowing toward the display area 103. As a result, the width of the boundary portion between the seal region 111 and the display area 103 can be small, thereby reducing the outside dimension of the LCD panel 100.

Figure 7A:
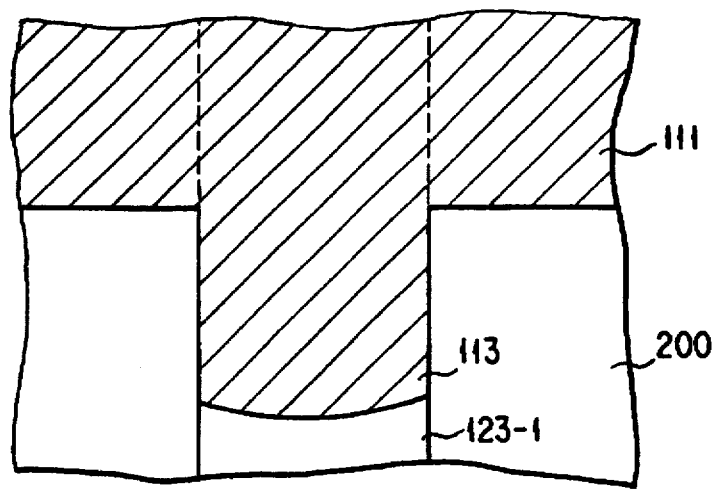
Figure 7B:
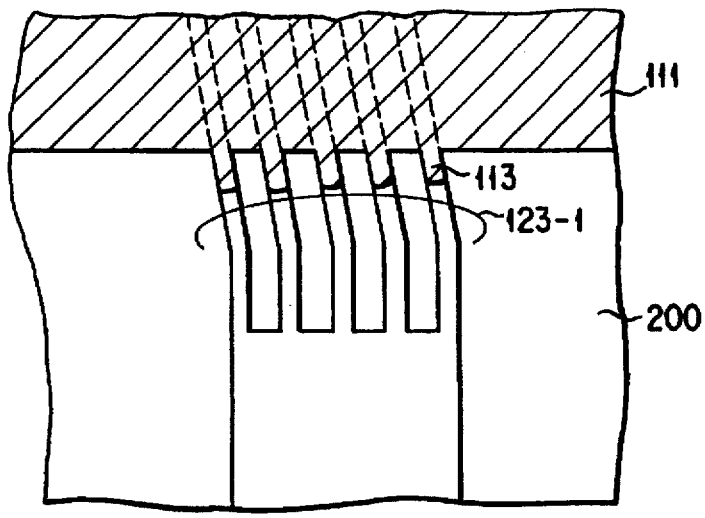

(e) Since the second wiring line 123 crossing the seal region 111 is constituted by a plurality of narrow lines (FIG. 3), the amount of the sealing agent 113 which flows outside the seal region 111 along the lines can be reduced, for the following reason. If the second wiring line 123 is formed on one line as shown in FIG. 7A, a large amount of sealing agent 113 will flow outside the seal region along the line, resulting in that adhesion between the array substrate 200 may be defective and the counter substrate 500, or a crack or breakage of the substrate may occur in the step of cutting off the array substrate 200. On the other hand, if the second wiring line 123 is divided into a plurality of narrow lines as shown in FIG. 7B, the amount of the sealing agent 113 which flows outside the seal region 111 along the lines can be reduced. The aforementioned defect, therefore, can be prevented.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An LCD panel comprising: pixel electrodes;

a first substrate including a display area in which the pixel electrodes are arranged and a seal region;

a second substrate including a counter electrode, the second substrate being arranged opposite to the first substrate with a gap interposed therebetween and being adhered to the first substrate in the seal region;

power supply being arranged outside of the seal region;

a wiring line, which supplies a voltage from the power supply pad to the counter electrode, comprising a plurality of narrow lines, the wiring line extending toward the display area and along the seal region; and a light modulating layer held between the first and second substrates.

2. The LCD panel according to claim 1, wherein part of the plurality of narrow lines of the wiring line that are arranged along the seal region are arranged in the seal region and the other part of the plurality of narrow lines that are arranged along the seal region are arranged in a boundary region between the seal region and the display area.

3. The LCD panel according to claim 1, wherein the counter electrode is connected to the wiring line through a connecting member arranged between the first and second substrates.

4. The LCD panel according to claim 3, wherein the connecting member is arranged outside the seal region and between the first and second substrates, and the wiring line includes a branch wiring line connected through the seal region to the connecting member.

5. The LCD panel according to claim 4, wherein the branch wiring line is constituted by a plurality of narrow lines.

6. The LCD panel according to claim 1, wherein the first substrate includes a data line, a scanning line and a switching element connected to the data line and the scanning line, and a pixel electrode connected to the switching element, the wiring line being formed in a step of producing the data line or the scanning line.

7. The LCD panel according to claim 1 further comprising at least one additional power supply pad.

8. The LCD panel according to claim 7, wherein the power supply pads are arranged along opposite sides of the LCD panel.

9. An LCD panel comprising:
pixel electrodes;

a first substrate including a display area in which the pixel electrodes are arranged and a seal region arranged around the display area;

a second substrate including a counter electrode, the second substrate being arranged opposite to the first substrate with a gap interposed therebetween and being adhered to the first substrate in the seal region;

a power supply pad arranged outside of the seal region;

a wiring line, which supplies a voltage from the power supply pad to the counter electrode, comprising a plurality of narrow lines, the wiring line extending toward the display area and along the seal region; and a light modulating layer held between the first and second substrates.

10. The LCD panel according to claim 9, wherein the counter electrode is connected to the wiring line through a connecting member arranged between the first and second substrates.

11. The LDC panel according to claim 9 wherein the first substrate includes a data line, a scanning line and a switching element connected to the data line and the scanning line, a pixel electrode connected to the switching element, and a storage capacitor line arranged opposite to the pixel electrode with a dielectric film interposed therebetween, and the wiring line is electrically connected to the storage capacitor line.

12. The LCD panel according to claim 9 further comprising at least one additional power supply pad.

13. The LCD panel according to claim 12, wherein the power supply pads are arranged along opposite side of the LCD panel.

14. An LCD panel comprising:

a first substrate including a display area, a seal region formed around the display area, and a peripheral region formed around the seal region, the display area including pixel electrodes, and the seal region including a wiring line extending toward the display area and along the seal region;

a second substrate including a counter electrode, to which a voltage is applied through the wiring line, the second substrate being arranged opposite to the first substrate with a gap interposed therebetween and adhered to the first substrate in the seal region; and a light modulating layer held between the first and second substrates.

15. The LCD panel according to claim 14, wherein the wiring line is constituted by a plurality of narrow lines.

16. The LCD panel according to claim 15, wherein part of the plurality of narrow lines of the wiring line that are arranged along the seal region are arranged in the seal region and the other part of the plurality of narrow lines that are arranged along the seal region are arranged in a boundary region between the seal region and the display area.

17. The LCD panel according to claim 15, wherein the counter electrode is connected to the wiring line through a plurality of connecting members arranged between the first and second substrates.

18. The LCD panel according to claim 17, wherein the first substrate includes data lines, scanning lines, switching devices controlled by the scanning lines, and the pixel electrodes connected to the data lines via the switching devices.

19. The LCD panel according to claim 18, wherein the data lines are drawn only from a first side of the first substrate and the scanning lines are drawn only from a second side of the first substrate adjacent to the first side thereof.

20. The LCD panel according to claim 19, wherein part of the connecting members are arranged on the first side of the first substrate and the other part of the connecting members are arranged on a third side of the first substrate, which is opposite to the first side thereof.

21. The LCD panel according to claim 20, wherein part of the connecting members are arranged on the first side of the first substrate in the peripheral region, the other part of the connecting members are arranged on the third side of the substrate in the peripheral region, and, the first wiring line has branch lines connected through the seal region to the part of the connecting members or the other part of the connecting members.

22. The LCD panel according to claim 21, wherein the branch wiring line is constituted by a plurality of narrow lines.

23. The LCD panel according to claim 19, wherein part of the connecting members are arranged on the first side of the first substrate and the other part of the connecting members are arranged on the second side of the first substrate, which is adjacent to the first side thereof.

24. The LCD panel according to claim 23, wherein part of the connecting members are arranged on the first side of the first substrate in the peripheral region, the other part of the connecting members are arranged on the second side of the first substrate in the peripheral region, and the first wiring line has branch lines connected through the seal region to the part of the connecting members or the other part of the connecting members.

25. The LCD panel according to claim 24, wherein the branch wiring line is constituted by a plurality of narrow lines.

26. The LCD panel according to claim 19, wherein part of the connecting members are arranged on the second side of the first substrate and the other part of the connecting members are arranged on a fourth side of the first substrate, which is opposite to the second side thereof.

27. The LCD panel according to claim 26, wherein part of the connecting members are arranged on the second side of the first substrate in the peripheral region, the other part of the connecting members are arranged on the fourth side of the first substrate in the peripheral region, and the first wiring line has branch lines connected through the seal region to the part of the connecting members or the other part of the connecting members.

28. The LCD panel according to claim 27, wherein the branch wiring line is constituted by a plurality of narrow lines.

29. The LCD panel according to claim 15, wherein the narrow lines of the wiring line arranged in the seal region is at least three.

30. An LCD panel comprising:

a first substrate including a display area in which pixel electrodes are arranged, and a seal region including a wiring line extending toward the display area and along the seal region and having a plurality of openings formed along a longitudinal direction of the seal region;

a second substrate including a counter electrode and arranged opposite to the first substrate with a gap interposed therebetween, the second substrate being adhered to the first substrate in the seal region; and a light modulating layer held between the first and second substrates.

* * * * *